Sept. 28, 1937.　　　　J. T. REDDING　　　　2,094,410
TOURIST SEAT
Filed Aug. 4, 1936　　　3 Sheets-Sheet 1

Inventor
J. T. Redding
By C. A. Snow & Co.
Attorneys.

Sept. 28, 1937. J. T. REDDING 2,094,410
TOURIST SEAT
Filed Aug. 4, 1936 3 Sheets-Sheet 2

Inventor
J. T. Redding
By CASnow&Co.
Attorneys.

Sept. 28, 1937. J. T. REDDING 2,094,410
TOURIST SEAT
Filed Aug. 4, 1936 3 Sheets-Sheet 3
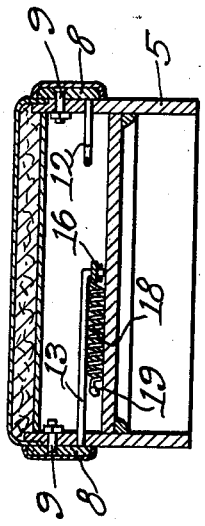
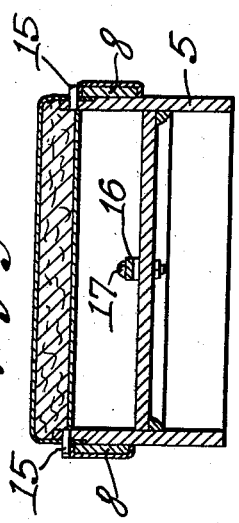
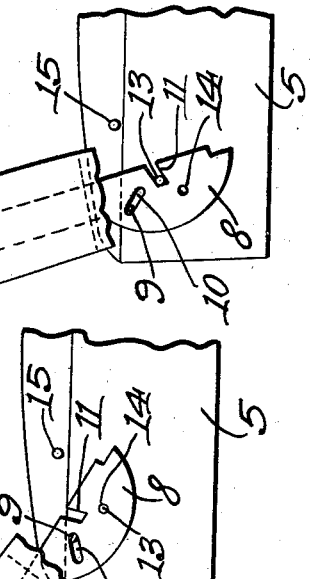
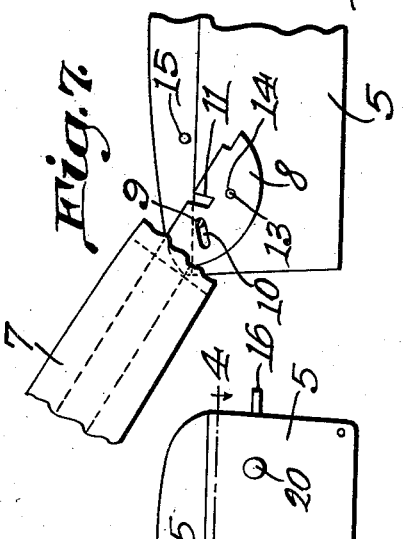
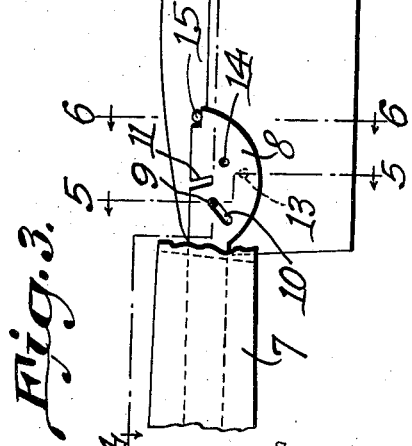
Inventor
J. T. Redding
By C. A. Snow & Co.
Attorneys Patented Sept. 28, 1937

2,094,410

UNITED STATES PATENT OFFICE 2,094,410

TOURIST SEAT

James Thomas Redding, Wilkesboro, N. C.

Application August 4, 1936, Serial No. 94,257

1 Claim. (Cl. 155—7)

This invention relates to convertible seats designed primarily for use in motor vehicles.

An important object of the invention is to provide a seat having an adjustable back, which may be readily and easily operated by the person occupying the seat with the result that the seat may be converted into a bed.

Another important object of the invention is to provide a securing means for securing the pivoted seat back in either its upright or horizontal positions to insure the seat back being held stationary after it has been adjusted to the desired position.

With the foregoing and other objects in view which will appear as the description proceeds, the invention resides in the combination and arrangement of parts, and in the details of construction hereinafter described and claimed, it being understood that changes in the precise embodiment of the invention herein disclosed, may be made within the scope of what is claimed without departing from the spirit of the invention.

Referring to the drawings:

Figure 3 is a detail view illustrating the means employed in connecting the seat back to the seat section.

Figure 4 is a sectional view through the seat of a motor vehicle, illustrating the seat back securing means.

Figure 5 is a sectional view taken on line 5—5 of Figure 3.

Figure 6 is a sectional view taken on line 6—6 of Figure 3.

Figure 7 is a view illustrating the back in an inclined position.

Figure 8 is a view illustrating the back in an upright position.

Figure 9 is a view illustrating the seat back wherein the extensions 8 are formed with additional bolt receiving openings.

Figure 1:
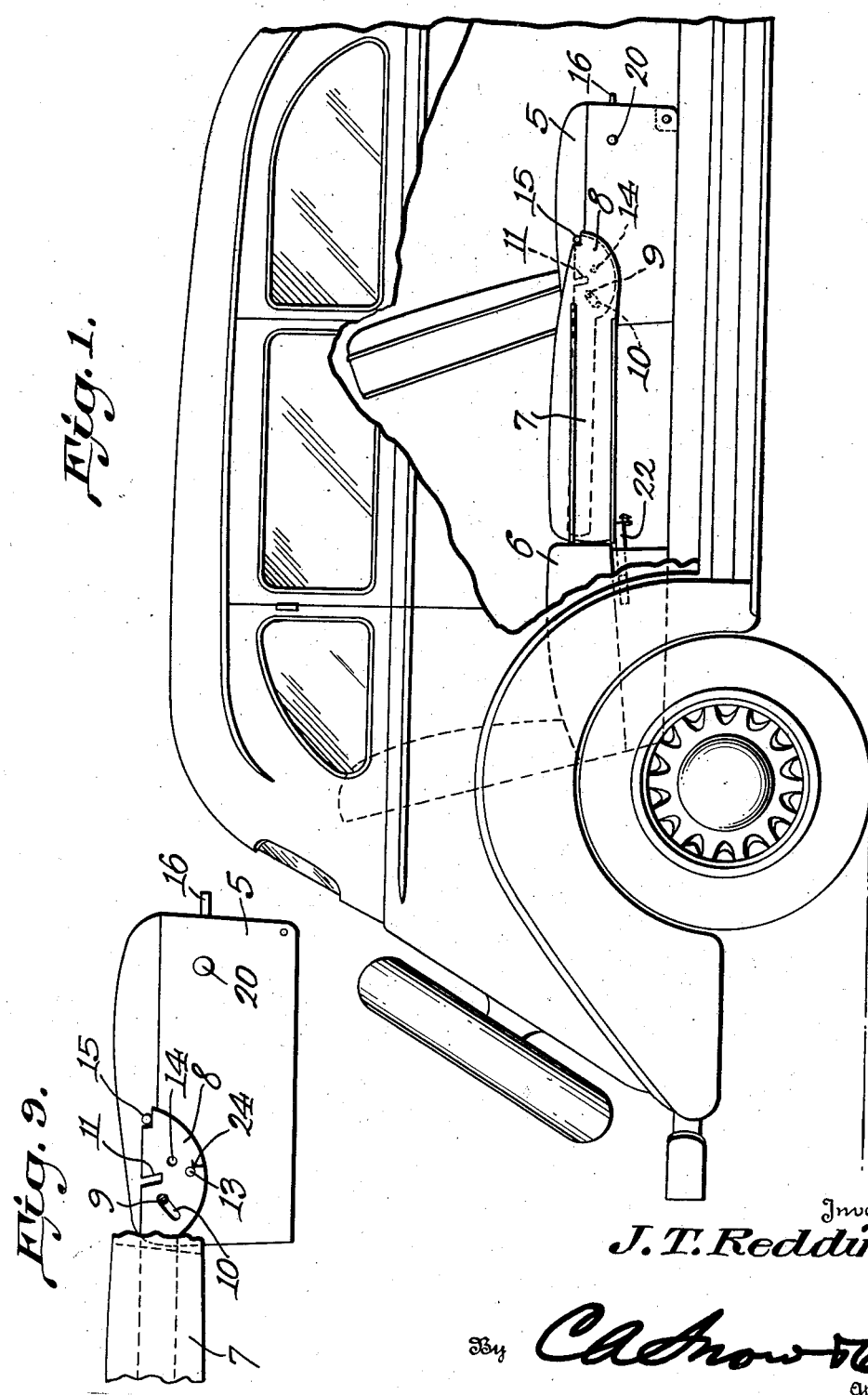
Figure 1 is a side elevational view illustrating a pivoted seat back moved to its horizontal position in the formation of a bed with the front and rear seats of a motor vehicle.
Figure 2:
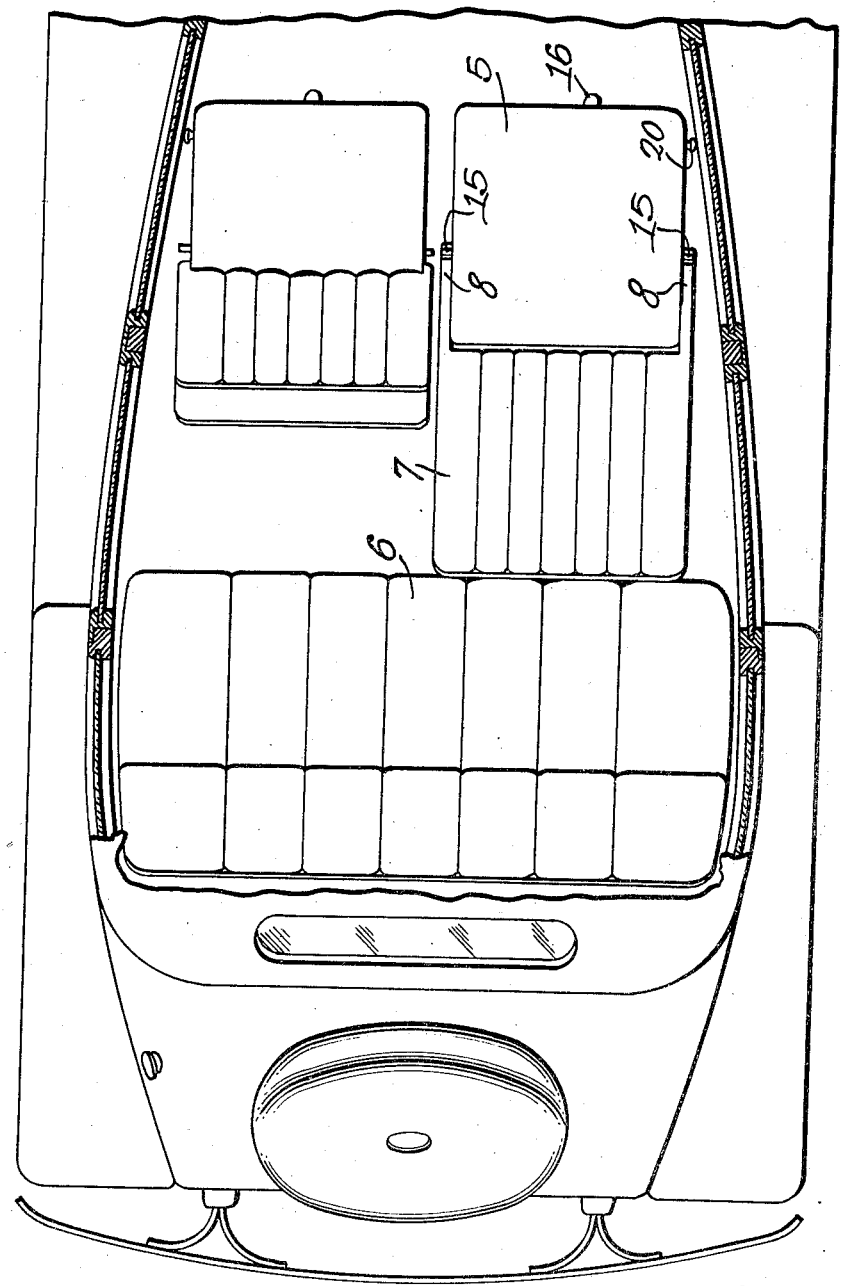
Figure 2 is a plan view thereof.

Referring to the drawings in detail, the reference character 5 designates the front seat of a motor vehicle, and the reference character 6 designates the rear seat of the vehicle. The back of the seat 5 is indicated by the reference character 7, and is provided with extensions 8 at its lower ends, the extensions 8 resting against the sides of the seat of which the back section forms a part.

Bolts 9 connect the back section to the seat section, the bolts operating in elongated openings 10 of the extensions 8, allowing free pivotal movement of the back of the seat. Due to the construction of the openings 10, it will be seen that the back section not only pivots with respect to the seat section, but is capable of slight sliding movement this sliding movement of the back section of the seat, shifts the pivot point of the back section to permit free pivotal movement of the back section preventing binding, due to the overstuffed construction of the seat cushions and back section. After the back section has been moved downwardly in the formation of a bed, the back section is slid rearwardly into close engagement of the front edge of the rear seat, whereupon the sliding bolts 12 and 13, to be hereinafter more fully described, lock the back section against movement. Thus it will be seen that due to this construction, the space between the outer edge of the seat section and front edge of the cushion of the rear seat, is eliminated.

Formed in one edge of each of the extensions 8 is a notch 11, adapted to accommodate the outer ends of the sliding bolts 12 and 13, which bolts when engaged in the notches, provide stops for the back section, securing the back section in its adjusted position. Openings 14 are also formed in the extensions 8, and are adapted to receive the bolts 12 and 13 when the back section is inclined as shown by Figure 7 of the drawings.

When the back section is moved to a horizontal position as shown by Figure 1 of the drawings, the pins 15 which extend laterally from the seat section engage in notches formed in the upper surface of the extensions 8 near the free ends thereof, providing stops for the back section, and bracing the back section to support the weight of a person lying on the back section.

The bolts 12 and 13 are connected with the lever 16, which is pivotally supported within the seat 5, the lever being of a length to extend through the front of the seat, where it may be gripped by the person occupying the seat to operate the bolts 12 and 13.

The pivot pin for the lever 16 is indicated by the reference character 17, and is disposed between the points of connection of the sliding bolts 12 and 13 with the lever 16, with the result that when the lever 16 is moved to the right or left, the bolts 12 and 13 will be moved in opposite directions.

A coiled spring 18 has connection with the inner end of the lever 16, the opposite end of the spring 18 being secured to the seat at 19.

This spring 18 is of such a construction that it will normally urge the bolts 12 and 13 outwardly, and in order to operate the bolts 12 and 13 it is necessary to move the lever 16 against the action of the spring 18.

In order that the lever 16 may be conveniently operated from a point exteriorly of the motor vehicle, an operating rod 19 is provided, which rod is formed with an opening at its inner end to accommodate the lever 16, the operating rod 19 passing through the side of the seat, where it is supplied with a knob 20 to be gripped by the operator. The coiled spring, indicated by the reference character 21 is mounted on the rod 19, and acts to normally urge the rod to a position to exert pressure on the lever 16 to the end that the bolts 12 and 13 are urged outwardly.

It will of course be understood that in the construction of a seat of this character, the upholstery will be so positioned over the back section and extensions that the extensions will be concealed.

In order to further support the back of the seat when in its horizontal position in the formation of a bed, a supporting bar 22 is provided, which bar slides in an opening in the front of the back seat of the vehicle, from where it may be readily and easily withdrawn or moved to a position as shown by Figure 1, where it receives the back section of the seat.

Stop pins 23 are positioned within the seat, and are engaged by the lever 16 to restrict movement of the lever and prevent the bolts 12 and 13 from being moved inwardly too far.

In the form of the invention as shown in the Figure 9 of the drawings, the extensions 8 are formed with openings 24 to receive the sliding bolts 12 and 13, when the seat back is in its horizontal position.

Assuming that the back of the seat is in a position as shown by Figure 8 of the drawings, and it is desired to move the back to its horizontal position:

It is only necessary for the person occupying the seat to operate the lever 16, causing the bolts 12 and 13 to move inwardly, disengaging the extensions, and releasing the back. The back is now swung rearwardly and the lever 16 released.

To return the back to its initial position, the back is swung forwardly until the ends of the bolts 12 and 13 snap into the notches 11, whereupon the back is held in an upright position.

To secure the back in an inclined position, the lever 16 is operated to retract the bolts 12 and 13. The back is now readily moved rearwardly until the ends of the bolts 12 and 13 snap into the openings 14 of the extensions, as shown by Figure 7 of the drawings.

Having thus described the invention what is claimed is:

In a convertible seat, a seat section and a back section, elongated extensions at the lower side edges of the back section, said extensions having elongated openings near the inner ends thereof, pivot pins extending from the seat section and disposed in the elongated openings pivotally connecting the back section to the seat section, stationary stop pins extending from the seat section, said extensions having notches formed at the free ends thereof and adapted to receive the stationary pins supporting the back section in a horizontal position, said extensions having elongated notches extending inwardly from the front edges thereof and having openings formed substantially centrally of the extensions, sliding bolts operating through openings formed in the seat section and adapted to move into the last mentioned notches and openings, holding the back section in various positions of adjustment.

JAMES THOMAS REDDING.